United States Patent [19]
Baker

[11] Patent Number: 4,584,600
[45] Date of Patent: Apr. 22, 1986

[54] DIGITAL FILTER FOR THE CHROMINANCE CHANNEL OF A COLOR-TELEVISION SET

[75] Inventor: Peotr Baker, Allington, England

[73] Assignee: ITT Industries, Inc., New York, N.Y.

[21] Appl. No.: 534,730

[22] Filed: Sep. 22, 1983

[30] Foreign Application Priority Data

Oct. 6, 1982 [EP] European Pat. Off. ........ 82710046.2

[51] Int. Cl.$^4$ .............................................. H04N 9/64
[52] U.S. Cl. ...................................... 358/40; 364/724
[58] Field of Search ............... 358/21 R, 40; 364/724; 375/103

[56] References Cited

U.S. PATENT DOCUMENTS

| | | | |
|---|---|---|---|
| 4,356,558 | 10/1982 | Owen | 364/724 |
| 4,403,245 | 9/1983 | Wischermann | 364/724 |
| 4,456,893 | 6/1984 | Otani | 364/724 |

FOREIGN PATENT DOCUMENTS

| | | | |
|---|---|---|---|
| 0105072 | 4/1984 | European Pat. Off. | 358/40 |
| 58-205379 | 11/1983 | Japan | 358/40 |
| 59-16490 | 1/1984 | Japan | 358/40 |

Primary Examiner—Michael A. Masinick
Attorney, Agent, or Firm—Donald J. Lenkszus

[57] ABSTRACT

A digital filter serves to compensate for the reduction in the amplitude of the chrominance-subcarrier reference (fc) caused by the passband of the intermediate frequency stages, and thus to achieve a flat response in the filter's passband within the chrominance-channel bandwidth. The transfer function of the digital filter is $$Y(z)/X(z) = T(z) = 1/a + z^{-1} + z^{-2}/a,$$

where a is a number presettable by the manufacturer of the color-television set but constant in operation.

12 Claims, 5 Drawing Figures

DIGITAL FILTER FOR THE CHROMINANCE CHANNEL OF A COLOR-TELEVISION SET

BACKGROUND OF THE INVENTION

The present invention pertains to an integrated circuit of a digital filter forming part of the digital chrominance channel of a color-television set and containing at least one adder, one multiplier, and delay elements each providing a delay equal to one-fourth of the period of the chrominance-subcarrier reference of frequency fc.

Color-television sets of this kind are described in Offenlegungsschrift DE No. 28 54 236 A1. There, the composite color signal is processed by all-digital means: In the direction of signal flow behind the intermediate-frequency stages and the video detector, there is a transition from analog to digital signal processing, i.e., an analog-to-digital converter is provided there.

From the circuit technology of conventional color-television sets with analog processing circuitry it is known, cf. by O. Limann, "Fernsehtechnik ohne Ballast", 12th Edition, Munich, 1978, pages 201 to 206, particularly pages 204/205, that the reduction in the amplitude of the chrominance-subcarrier reference caused by the passband of the intermediate-frequency stages must be compensated for by a corresponding opposite frequency response of the chrominance amplifier, so that a response in the passband for the chrominance signal is obtained which is as flat and symmetrical as possible on both sides of the frequency of the chrominance-subcarrier reference, and whose bandwidth in, e.g., the PAL system is 1.4 MHz.

SUMMARY OF THE INVENTION

It is an object of the invention to provide, for color-television receivers with digital signal processing circuitry as disclosed in the Offenlegungsschrift referred to above, an integrated circuit for a corresponding digital filter which makes it possible to compensate, in the course of the digital signal processing, for the reduction in the amplitude of the chrominance-subcarrier reference caused by the intermediate-frequency stages. Other objects are to make the slope of the digital filter's frequency response variable while maintaining a constant center-frequency gain and a constant group delay, and to achieve a linear phase shift characteristic.

A digital filter in accordance with the principles of the invention serves to compensate for the reduction in the amplitude of the chrominance-subcarrier reference (fc) caused by the passband of the intermediate frequency stages, and thus to achieve a flat response in the filter's passband within the chrominance-channel bandwidth. The transfer function of the digital filter is $Y(z)/X(z) = T(z) = 1/a + z^{-1} + z^{-2}/a$, where a is a number presettable by the manufacturer of the color-television set but constant in operation.

BRIEF DESCRIPTION OF THE DRAWINGS

The invention, its advantages, and embodiments will now be explained in more detail with reference to the accompanying drawings, in which.

DETAILED DESCRIPTION

Figure 1:
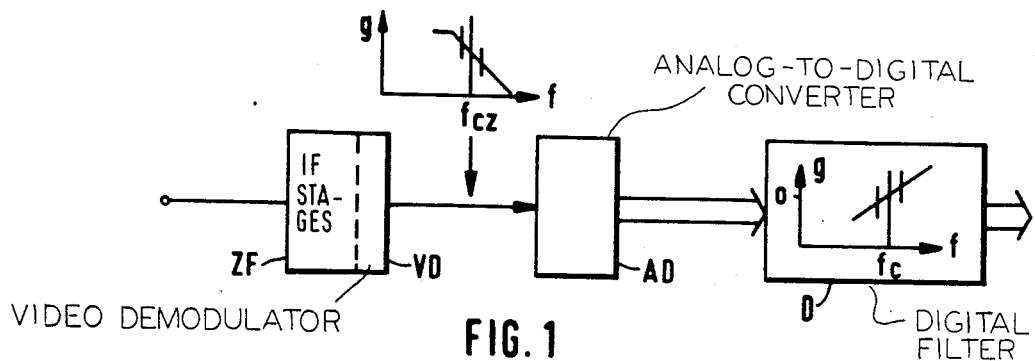
FIG. 1 is a block diagram of the chrominance channel of a color-television set using a digital filter in accordance with the invention.

FIG. 1 is a highly schematical block diagram showing those parts of the chrominance channel of a digital color-television receiver which are necessary to understand the invention. In the region of the frequency fcz, corresponding to the frequency of the chrominance-subcarrier reference, the intermediate-frequency stages ZF have the frequency response shown at the top of FIG. 1, where g is the gain of the intermediate-frequency stages ZF, and f is the frequency. The slope of the falling portion is usually 6 dB per octave.

The output signal of the video demodulator VD following the intermediate-frequency stages ZF is applied to the input of the analog-to-digital converter AD, whose output is coupled to the input of the digital filter D serving to equalize the frequency response of the chrominance channel in accordance with the invention.

Figure 2:
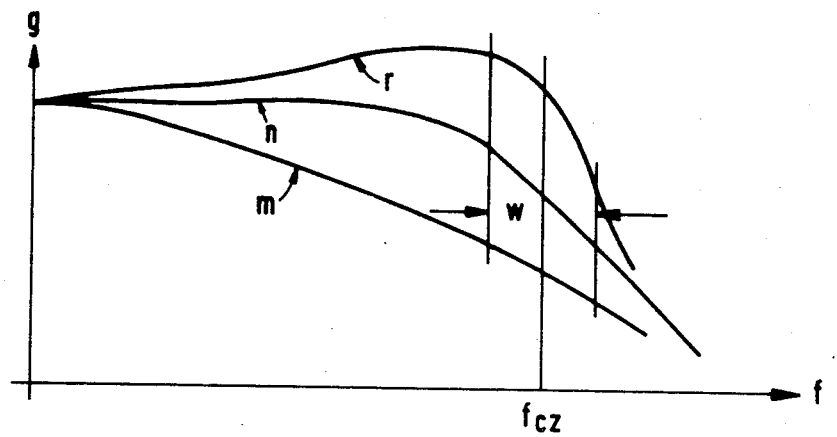
FIG. 2 shows schematically the range of variation in the response in the passband of the IF stages of a color-television set.

FIG. 2 shows the possible response in the passband of the intermediate-frequency stages ZF in an enlarged diagrammatic representation as compared with that of FIG. 1. The curve designated n is the desired, i.e., nominal, curve, while the curves m, r are the limiting curves of the range of manufacturing variations of the frequency response. Located symmetrically with respect to the frequency fcz is the frequency band of the chrominance signal, whose width is designated w. From FIG. 2 it follows that the color-television set manufacturer should permit a compensation of manufacturing variations in the frequency response of the intermediate-frequency stages by making it possible to influence the frequency response of the compensating filter.

To create this possibility, according to the invention, the transfer function T(z) of the digital filter satisfies the following equation:

$$Y(z)/X(z) = T(z) = 1/a + z^{-1} + z^{-2}/a,$$

where a is a number which is constant during operation of the digital filter but can be preset, i.e., adjusted, during the manufacture of the color-television set.

Figure 3:
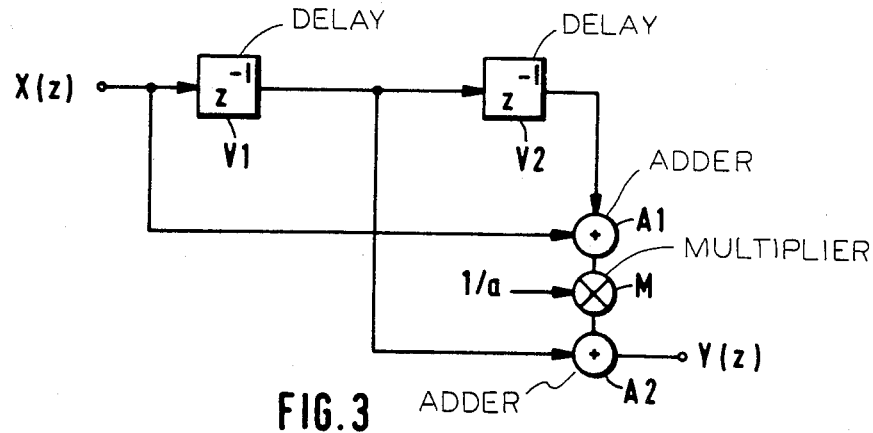
FIG. 3 is a block diagram of a first embodiment of the invention.

FIG. 3 shows a first embodiment of the integrated circuit of the digital filter in a usual digital filter block diagram. The input signal X(z) is applied to the input of the first delay element V1 and to the input of the first adder A1, while the output of the first delay element V1 is connected to the first input of the second adder A2. The output of the latter is the output of the digital filter. The output of the first delay element V1 is also connected to the input of the second delay element V2, which has its output coupled to the second input of the first adder A1. The output of the adder A1 is connected to the first input of the multiplier M, whose second input is fed with a signal representing the number 1/a.

Figure 4:
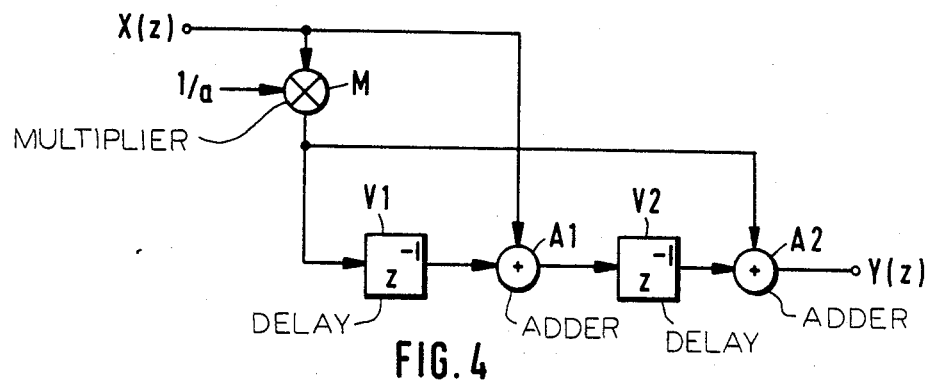
FIG. 4 is a block diagram of a second embodiment of the invention.

FIG. 4 shows a second embodiment of the invention, also in a block diagram. The input signal X(z) is applied to the first input of the multiplier M, whose second input is fed with a signal representing the number 1/a, and to the first input of the first adder A1. The output of the multiplier M is connected to the input of the first delay element V1, which has its output coupled to the second input of the first adder A1, and to the first input of the second adder A2, whose output is the output of the digital filter and, thus, provides the output signal Y(z). The output of the first adder A1 is coupled to the input of the second delay element V2, whose output is connected to the second input of the second adder A2.

In FIGS. 3 and 4, the delay provided by each of the delay elements V1, V2 is equal to the period of a signal having four times the frequency fc of the chrominance-subcarrier reference of the color-television set.

Figure 5:
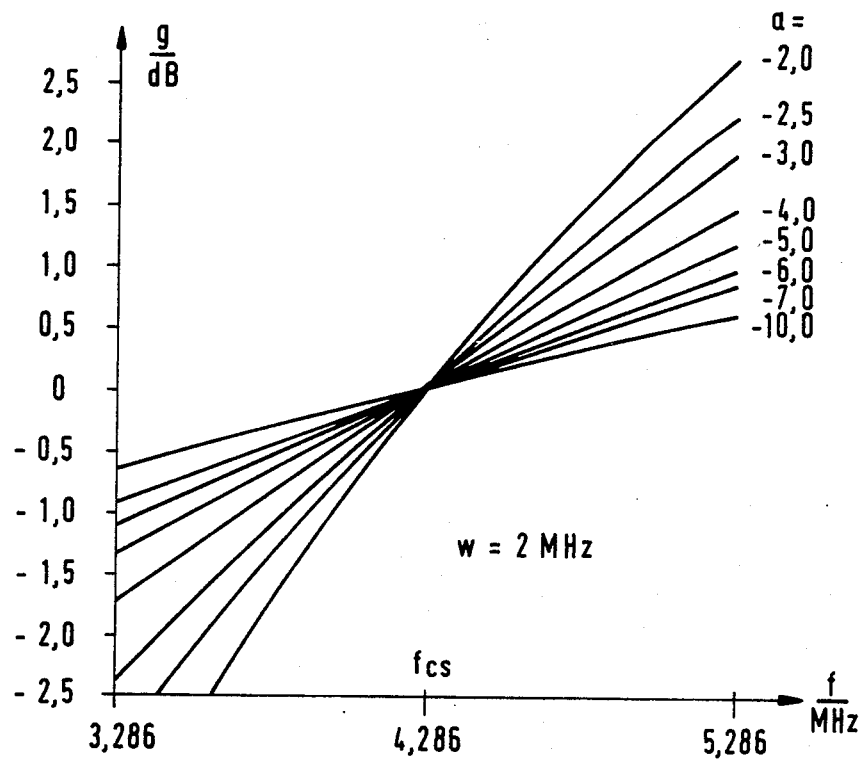
FIG. 5 shows the frequency response of the digital filter according to the invention in the range of the chrominance-subcarrier frequency of the SECAM color-television system.

FIG. 5 shows the frequency response of a digital filter in accordance with the invention for a SECAM color-television receiver, in which the frequency fcs of the chrominance-subcarrier reference is 4.286 MHz. It shows eight curves of different slope for the numerical values of a given on the upper right, with the bandwich w being 2 MHz.

It is evident to one skilled in the art that corresponding responses in the passband of a digital filter, referred to the respective frequency of the chrominance-subcarrier reference, can also be implemented for PAL and NTSC color-television sets.

In view of the high frequencies to be processed, the adders, multipliers, and delay elements used advantageously are designed to process multidigit data signals in parallel.

The invention permits an electrically simpler equalization of the frequency response of the chrominance channel than is possible with color-television sets having purely analog signal processing circuitry, a particular advantage being the simple possibility of compensating for manufacturing variations in the manner described.

What is claimed is:

1. A digital filter for use in a digital chrominance channel comprising:
    an input terminal;
    an output terminal;
    at least one adder;
    a multiplier having a multiplicand factor of 1/a wherein "a" is a presetable number of which is constant during operation of said digital filter;
    and a plurality of delay elements each providing a delay equal to one-fourth of the period of the chrominance-subcarrier reference frequency fc;
    wherein the frequency of the clock signal of the digital filter is four times the frequency fc;
    said at least one adder, said multiplier, and said plurality of delay elements being interconnected to provide a transfer function T(z) between said input and output terminal wherein $T(z) = 1/a + z^{-1} + z^{-2}/a$ where z is the variable of the z plane.

2. A digital filter in accordance with claim 1 comprising a second adder; and wherein said input terminal is coupled to an input of a first one of said plurality of delay elements and to a first input of said one adder;
said first delay element has an output coupled to said output terminal;
a second one of said plurality of delay elements has an input coupled to said first delay element output and an output coupled to a second input of said one adder;
and said multiplier has a first input coupled to the output of said one adder, a second input receiving a representation of the number "a", and an output coupled to the second input of said second adder.

3. A digital filter in accordance with claim 1 wherein $-2 \leq a \leq -10$.

4. A digital filter in accordance with claim 2 wherein $-2 \leq a \leq -10$.

5. A digital filter in accordance with claim 1 wherein each of said at least one adder, said multiplier and said plurality of delay elements process multidigit data in parallel.

6. A digital filter in accordance with claim 3 wherein each of said at least one adder, said multiplier and said plurality of delay elements process multidigit data in parallel.

7. A digital filter in accordance with claim 2 wherein each of said one adder, said second adder, said multiplier, and said first and second delay elements process multidigit data in parallel.

8. A digital filter in accordance with claim 4 wherein each of said one adder, said second adder, said multiplier, and said first and second delay elements process multidigit data in parallel.

9. A digital filter in accordance with claim 1 comprising a second adder and wherein:
    said multiplier has a first input coupled to said input terminal and a second input receiving a representation of the number "a", and an output coupled to the input of a first one of said delay elements;
    said at least one adder having a first input coupled to the output of said first delay element, a second input coupled to said input terminal and an output coupled to the input of a second one of said delay element;
    said second adder having a first input coupled to the output of said second delay element, a second input coupled to the output of said multiplier and an output coupled to said output terminal.

10. A digital filter in accordance with claim 9 wherein $-2 \leq a \leq -10$.

11. A digital filter in accordance with claim 9 wherein each of said at least one adder, said multiplier and said plurality of delay elements process multidigit data in parallel.

12. A digital filter in accordance with claim 10 wherein each of said at least one adder, said multiplier and said plurality of delay elements process multidigit data in parallel.

* * * * *